Aug. 21, 1962  V. H. NASH ET AL  3,050,579
AUTOMATIC FILES SYSTEM
Filed Sept. 3, 1958  20 Sheets-Sheet 1

INVENTORS
Victor H. Nash
and Roy F. Nash
BY *Thomas, Weisman & Russell*
ATTORNEYS Aug. 21, 1962 V. H. NASH ET AL 3,050,579
AUTOMATIC FILES SYSTEM
Filed Sept. 3, 1958 20 Sheets-Sheet 2
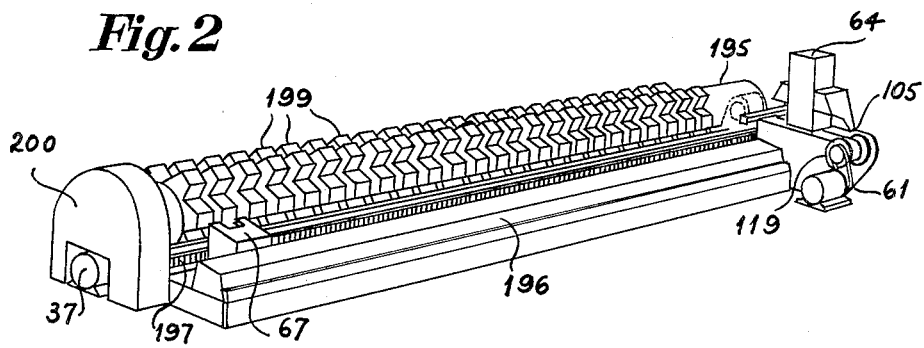
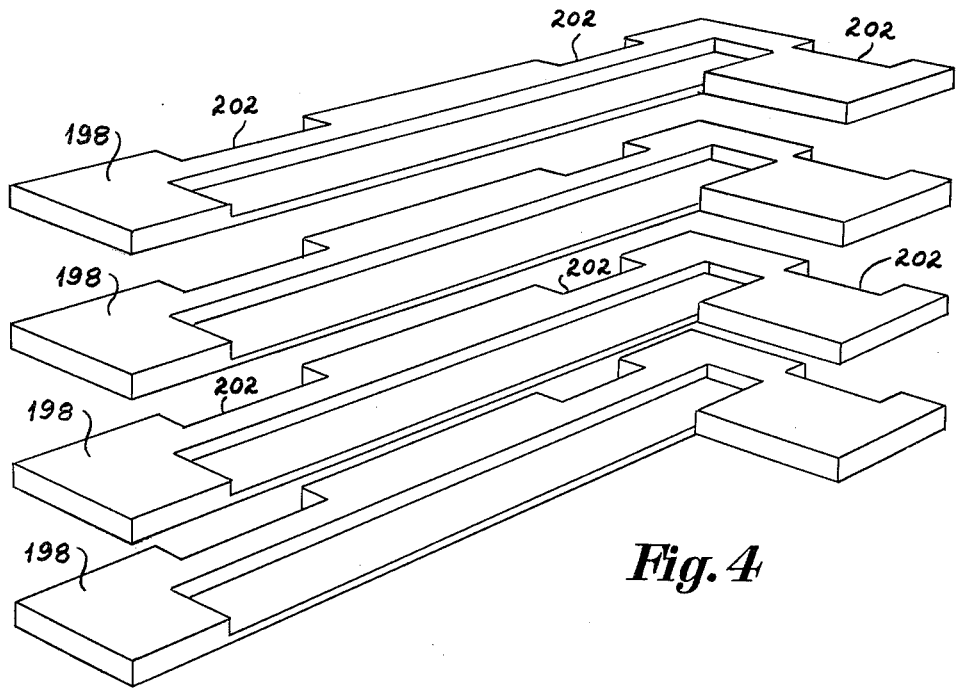
INVENTORS
Victor H. Nash
and Roy F. Nash
BY Thomas, Weisman & Russell
ATTORNEYS

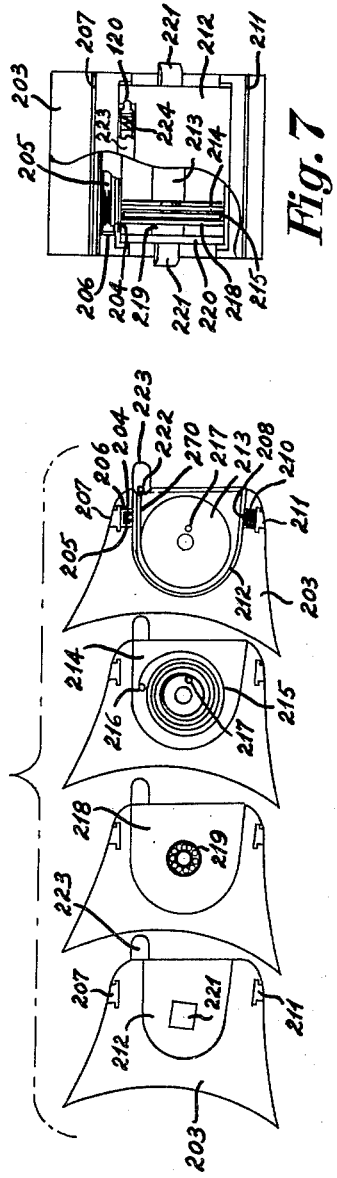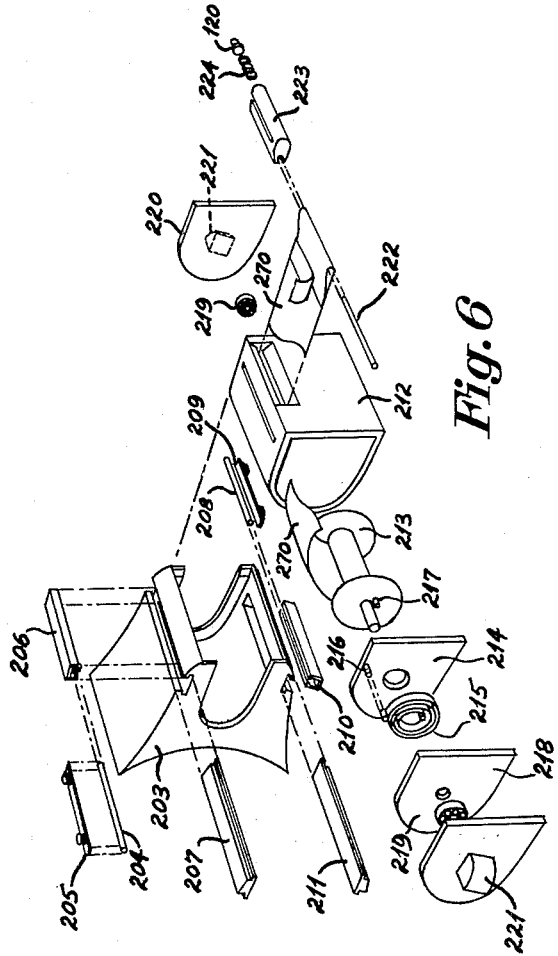

Aug. 21, 1962         V. H. NASH ET AL         3,050,579
                      AUTOMATIC FILES SYSTEM

Filed Sept. 3, 1958                    20 Sheets-Sheet 5

INVENTORS
Victor H. Nash
and Roy F. Nash

BY Thomas, Weisman & Russell
ATTORNEYS

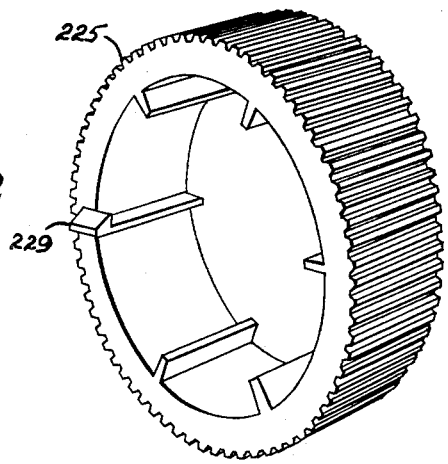
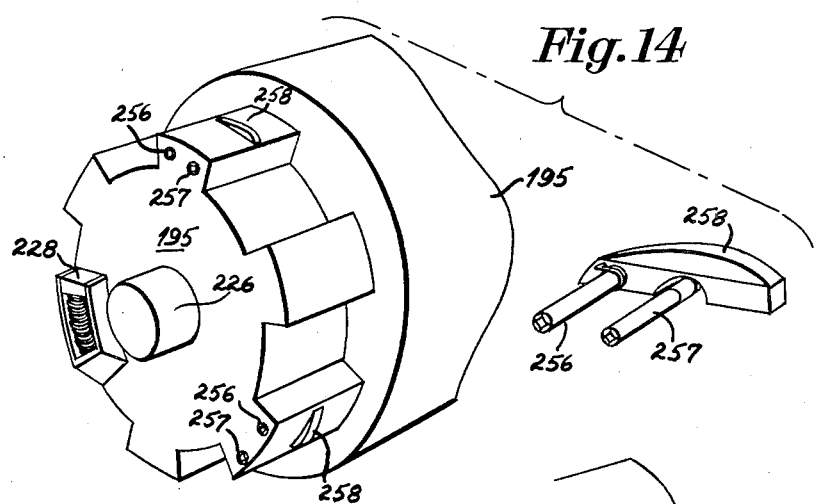
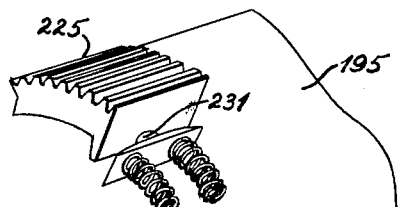
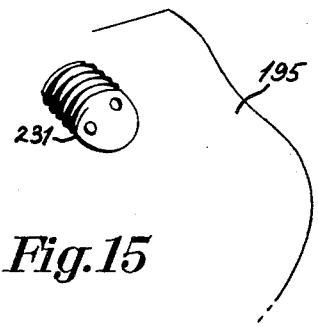
Fig.12
Fig.14
Fig.13
Fig.15
INVENTORS
Victor H. Nash
and Roy F. Nash
BY *Thomas, Weisman & Russell*
ATTORNEYS

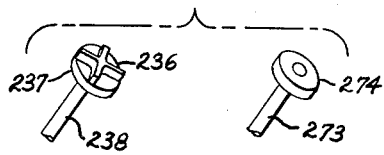
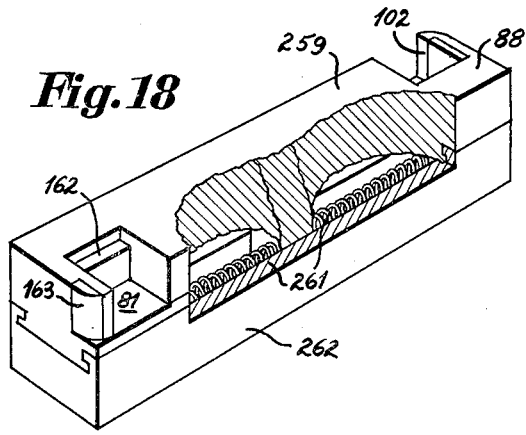
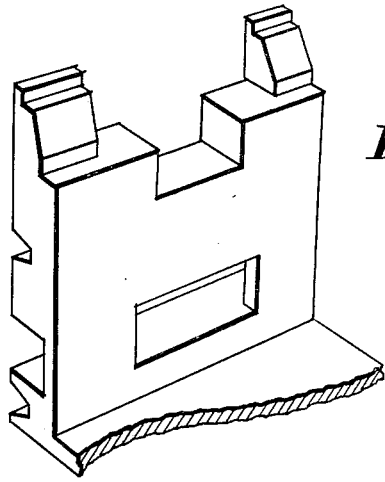

Aug. 21, 1962 — V. H. NASH ET AL — 3,050,579
AUTOMATIC FILES SYSTEM
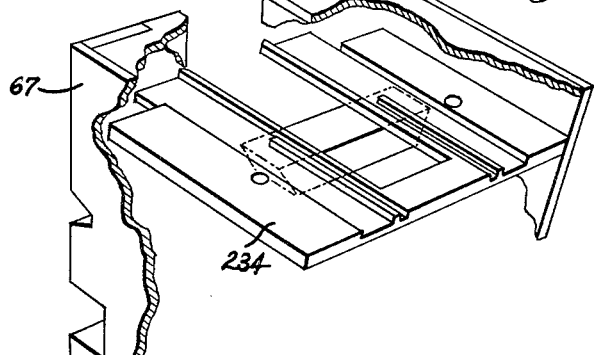
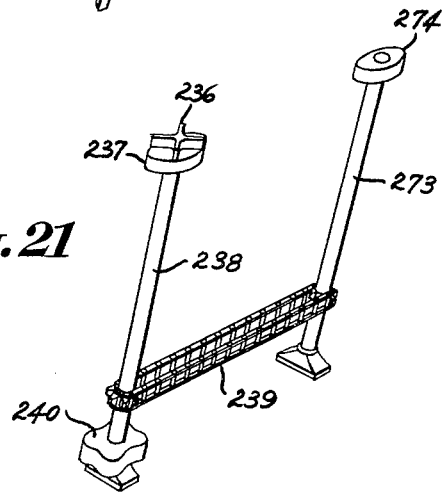
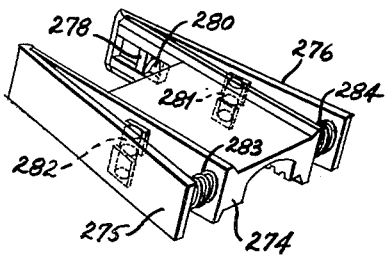
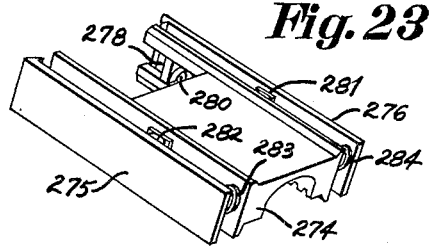
INVENTORS
Victor H. Nash
and Roy F. Nash
BY Thomas, Weisman & Russell
ATTORNEYS Aug. 21, 1962  V. H. NASH ET AL  3,050,579
AUTOMATIC FILES SYSTEM
Filed Sept. 3, 1958  20 Sheets-Sheet 12
Fig. 24
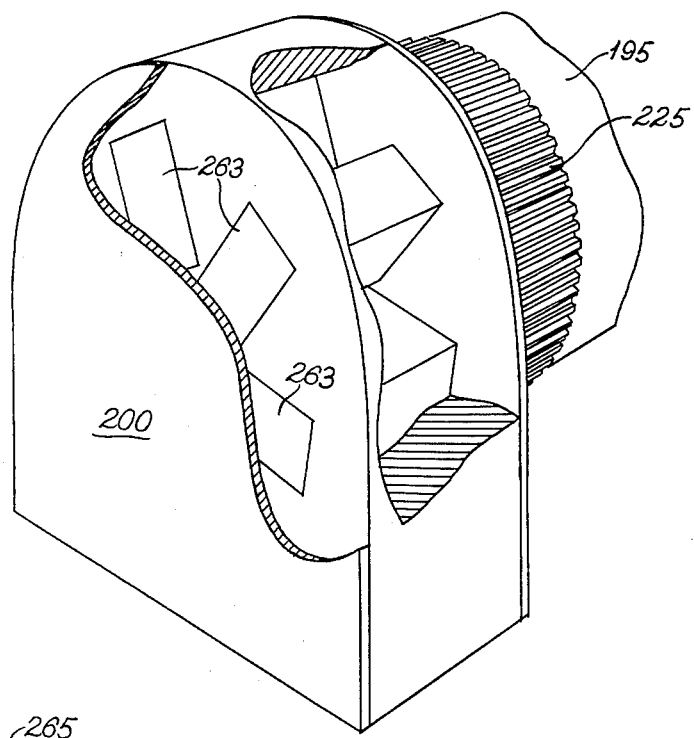
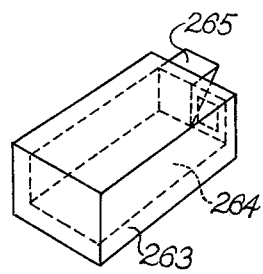
Fig. 25
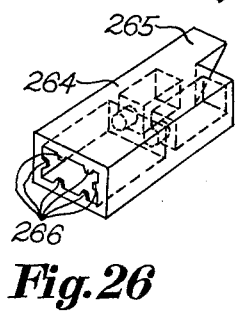
Fig. 26
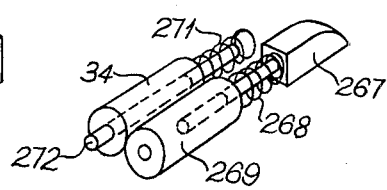
Fig. 27
INVENTORS
Victor H. Nash
and Roy F. Nash
BY *Thomas, Weisman & Russell*
ATTORNEYS

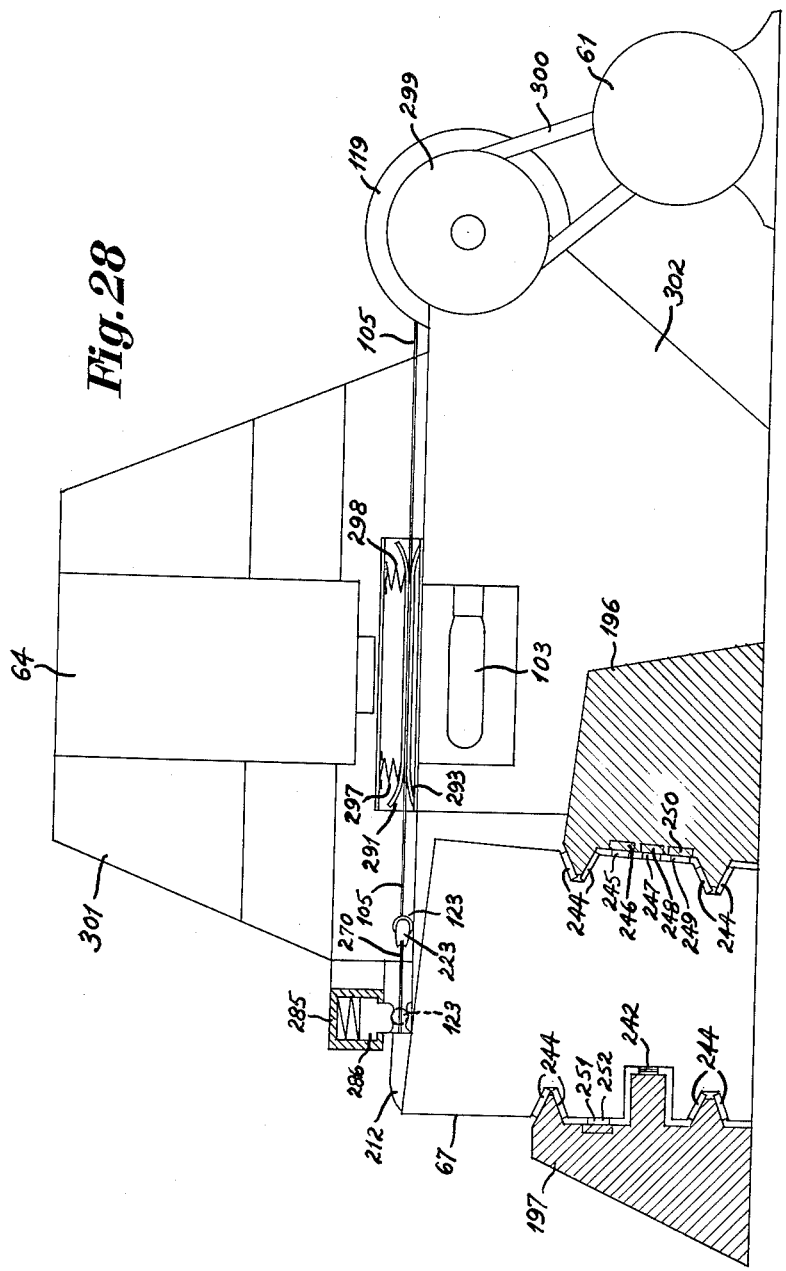

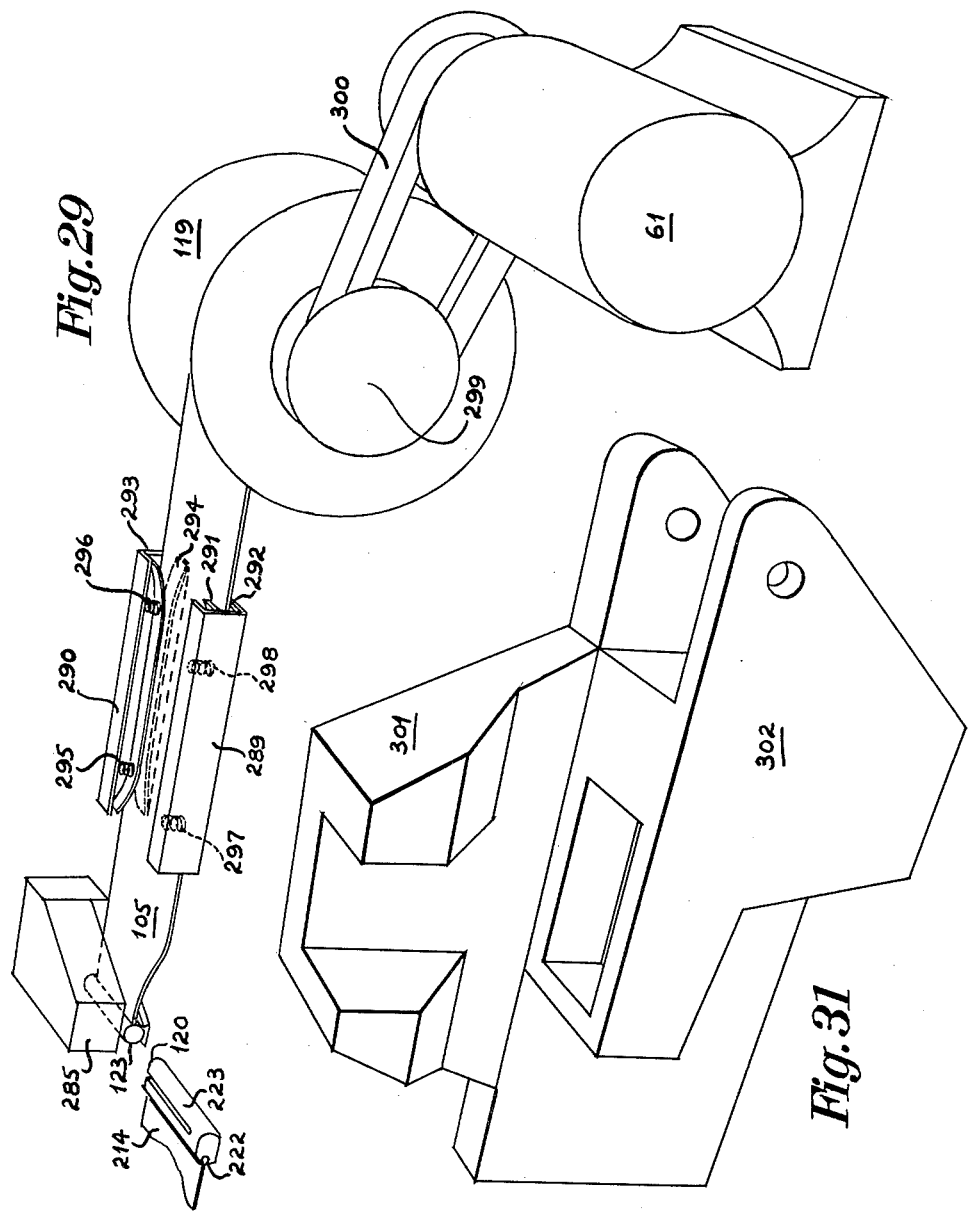
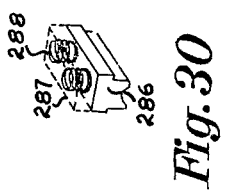
INVENTORS
Victor H. Nash
and Roy F. Nash

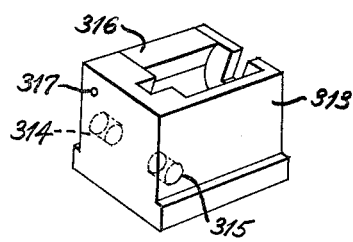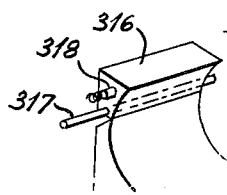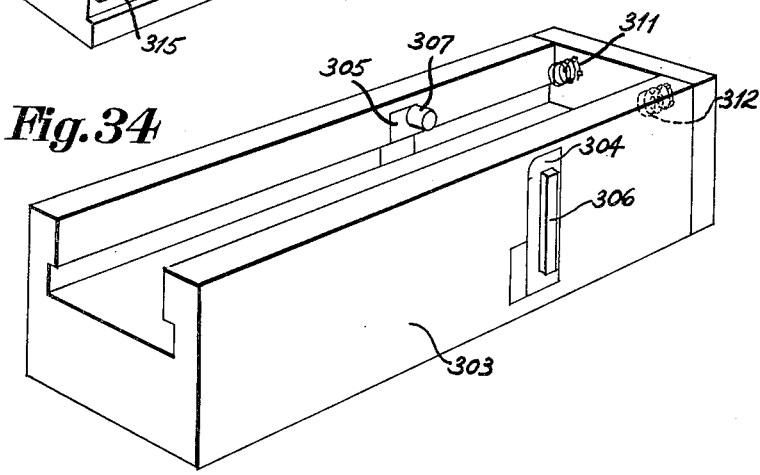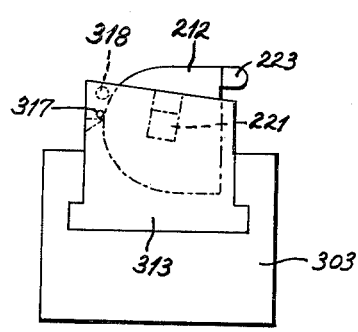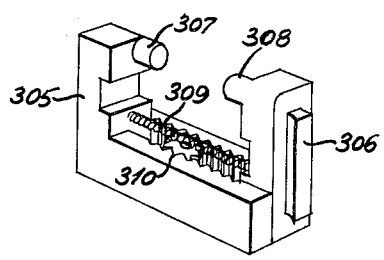

Aug. 21, 1962    V. H. NASH ET AL    3,050,579
AUTOMATIC FILES SYSTEM
Filed Sept. 3, 1958    20 Sheets-Sheet 16

INVENTORS
Victor H. Nash
and Roy F. Nash

BY Thomas, Weisman & Russell
ATTORNEYS

Aug. 21, 1962  V. H. NASH ET AL  3,050,579
AUTOMATIC FILES SYSTEM
Filed Sept. 3, 1958  20 Sheets-Sheet 17

INVENTORS
Victor H. Nash
and Roy F. Nash
BY Thomas, Weisman & Russell
ATTORNEYS

INVENTORS
Victor H. Nash
and Roy F. Nash
BY Thomas, Weisman & Russell
ATTORNEYS

United States Patent Office 3,050,579
Patented Aug. 21, 1962

3,050,579
AUTOMATIC FILES SYSTEM
Victor H. Nash, 814 Oakwood Drive, Falls Church, Va., and Roy F. Nash, 1012 S. Quebec St., Arlington 4, Va.
Filed Sept. 3, 1958, Ser. No. 758,806
4 Claims. (Cl. 178—5.6)

This invention relates to a novel combination of elements providing an automatic files system which permits storage of the required files at a remote area, yet enables immediate viewing of the same by an operator over a closed circuit television unit, conveniently located, and interconnected to the microfilm storage until by an appropriate telephone control system.

More particularly, the invention provides for an entirely automatic operation for viewing files located at a remote storage point wherein an operator at a desk, by using an ordinary dial telephone which serves as the initial control means, can cause a designated file of correspondence in the form of micro-photographic film contained on a spool and housed in an individual cartridge for each file, to be withdrawn from its place of storage at a remote location and carried to a point where the film can be automatically fed through a television camera unit. When the telephone instrument is replaced on its cradle, control of the television process is effected by a remote control unit on a desk-model type of television receiver. By turning a control knob on the television receiver, the operator can cause the film to pass forward or backward past the lens of the television camera so that any or all items of correspondence on the spool of film may be viewed on the television receiver by turning the control knob to the "stop" position for each document to be viewed. Upon completion of viewing the film, the operator turns the control knob of the television receiver to "off," and the film is automatically rewound into its cartridge and the cartridge automatically returned to its place of storage. If the operator should neglect to turn the television receiver "off," a timing device in the television receiver unit automatically causes the film to be rewound and returned to its place of storage.

It is perhaps a matter of common knowledge that the relatively giant size of industrial operations as well as governmental functions has presented a real problem with respect to the storage of files in permanent fashion, particularly where such documents must be accessible for continued reference over the years. The care of files and the personnel required to attend them, both from the viewpoint of initially recording their location and storing the same, as well as from the viewpoint of convenience, space, cost of filing personnel, etc., presents in many instances a real dilemma. The instant invention is presented as a solution to this long standing problem, offering a method and means which, over the long run, will pay for itself in original capital outlay many times over, if once installed and maintained as a permanent and efficient system. An additional object of the invention is to provide a files system whereby a given volume of records, having been transferred to micro-photographic film, is housed in a storage unit occupying substantially less floor space than would be occupied by conventional file cabinets containing the same volume of records in their original form. This files system enables a business or governmental organization to take advantage of centrally locating its files for all of its offices within a radius of approximately fifteen miles. Duplicate staffs of file clerks are thus eleminated, with only a minimum files center personnel staff necessary to supervise the automatic equipment described herein.

Another important object of this invention is to make possible complete control over all records and correspondence files, since no files physically leave their storage units—yet, to permit instant viewing at will by means of television. This precludes damage to or loss of records under conventional files systems. Since no records leave the files center, there is no necessity to maintain charge-out records showing the names and locations of borrowers.

The novel automatic files system comprising this invention makes it possible to release existing conventional files storage equipment to the extent that the acquisition cost of the automatic equipment would be substantially reduced. The automatic system makes substantial savings possible in annual operating costs of records management, through a material reduction in personnel handling files, through a material reduction in floor space occupied by files, in the complete elimination of files handling beyond the files center, and through the capability of the automatic files system to render almost instantaneous service in the selection and viewing of files.

Other objectives of this invention are: to provide a files system whereby records, in being filmed microphotographically, may be simultaneously duplicated on negative film for bombproof storage as a disaster control measure; or, the entire files center of a business or governmental organization, through the compactness of the equipment utilized in this files system, could be centralized in a bombproof location; to provide a files system embodying television equipment which could also be utilized for puposes other than the reviewing of records, such as for the mass transmission of instructions in the form of training programs or demonstrations, important announcements, etc.; to provide a files system which makes it possible to substantially reduce the number of carbon copies of correspondence for distribution purposes, since anyone with access to a telephone and television receiver, both connected to the automatic files system equipment, would have immediate access to all correspondence in the files center, and could be directed to view such correspondence as might be designated by means of a brief notice circulated, giving pertinent details necessary to locate such correspondence through the automatic equipment; to provide a files system embodying a medium for the permanent storage and preservation of records, yet subject to immediate or continual use by viewing, which being micro-photographic film, has proven to be suitable for permanent records to the same degree as the finest grades of record papers; to provide a files system embodying the use of micro-photographic film which is legally admissible in evidence in all but a few jurisdictions having no statutory provisions generally authorizing the admissibility of micro-photographic copies of records in evidence; to provide an automatic files system embodying standard closed-circuit television equipment which utilizes ordinary telephone lines in its transmission, thus precluding the necessity of installing coaxial cables or other means of transmission; and, to provide a files system which, through the elimination of conventional file cabinets, would eliminate the hazards to employees of injuries from top-heavy cabinets tipping over, hands and fingers mashed in closing file drawers, cuts from metal file fasteners (the use of which would be greatly reduced under the automatic system) and accidents in moving file cabinets.

Other objects and advantages of the invention will be apparent to those skilled in the art during the course of the following description:

In the accompanying drawings, forming a part of this application, and in which like numerals are employed to designate like parts throughout the same:

FIGURE 2 shows the microfilm selection and televising assembly;

FIGURE 4 is a perspective view of the subdivision of the frame;

FIGURE 5 illustrates sectional side views of the specially-designed microfilm cartridges which are required to facilitate the automatic selection and televising of the microfilm;

FIGURE 6 is an exploded view of the cartridge and seat assembly;

FIGURE 7 is a cutaway front view of the microfilm cartridge and seat assembly;

FIGURE 12 shows the ring gear removed from the clutch assembly;

FIGURE 13 is a cutaway section showing the spring adjustment detail of the clutch assembly;

FIGURE 14 shows the inner construction of the clutch assembly;

FIGURE 15 illustrates a typical spring adjusting screw for the clutch assembly;

FIGURE 17 illustrates the internal cam detail of the carrier unit;

FIGURE 18 is a cutaway view of the carrier arrestor;

FIGURE 19 illustrates the contour of the carrier's perpendicular front;

FIGURE 20 illustrates the lower plate of the carrier which provides support of the pinion and spur gears (shown in FIGURE 16) as well as serving as a guide for the sliding cartridge unit;

FIGURE 21 illustrates the complete internal cam assembly for the cartridge extractor unit;

FIGURE 22 shows the cartridge extractor unit in locking position;

FIGURE 23 shows the cartridge extractor in releasing position;

FIGURE 24 is a cutaway detail of the drum arrestor housing;

FIGURE 25 illustrates the drum arrestor body, exterior view;

FIGURE 26 shows the internal detail of the drum arrestor body;

FIGURE 27 illustrates the solenoid assembly contained in the arrestor body;

FIGURE 28 is a side view of the carrier unit and television camera assembly;

FIGURE 29 illustrates the automatic coupling and motorized microfilm take-up assembly;

FIGURE 30 illustrates the spring-backed coupling detent which functions in conjunction with the coupling and take-up assembly;

FIGURE 31 shows the mounting for the televison camera and take-up assembly;

FIGURE 32 illustrates a perspective view of a supplementary microfilm cartridge retaining unit for use with a "standby" television camera arrangement;

FIGURE 33 illustrates the cartridge release and lock detail;

FIGURE 34 shows the cartridge receiver-accepting frame;

FIGURE 35 illustrates a side view of the cartridge receiver in its frame;

FIGURE 36 illustrates the cartridge receiver locking detail;

The general step-by-step functioning of this invention is, as follows:

(1) An operator, desiring to review a file of correspondence (frequently referred to hereinafter as a "microfile"), refers to a suitable files director to obtain the telephone code number of the desired file;

(2) Turns television receiver control knob to "on" position, and turns appropriate switch on the telephone to obtain a special dial tone, indicating direct connection with automatic files selection circuit in files center;

(3) Proceeds to dial the telephone number of the desired file;

(4) Holds the telephone off its cradle until a "proceed" image appears on a conveniently located desk-model television receiver;

(5) Replaces the telephone handset on its cradle;

(6) Controls the motion of the file, on a microfilm spool, by means of a remote control knob on the television receiver; and, when the desired document appears, turns the control knob to its "stop" position;

(7) When review of the file is completed, the operator simply turns the control knob on the television receiver to "off" position. (Otherwise a timer will automatically turn off the receiver after a designated interval.)

From the foregoing résumé of the operation of the invention, it will thus be appreciated that the system is entirely automatic, easily controlled, safe to use, and comprises a novel combination of elements resulting in speedy access to all stored material, the latter being stored in a minimum of space due to the use of microfilm, yet being located in a suitable storage area at a point remote from the office worker.

A detailed explanation of the invention, with reference to the accompanying drawings wherein for the purpose of illustration is shown a preferred embodiment of our invention, is set forth in the following. This explanation is designed to enable others familiar with the art to adopt and use the same. Summarized in the claims are the novel features of construction and novel combination of parts, for which protection is desired.

Figure 1:
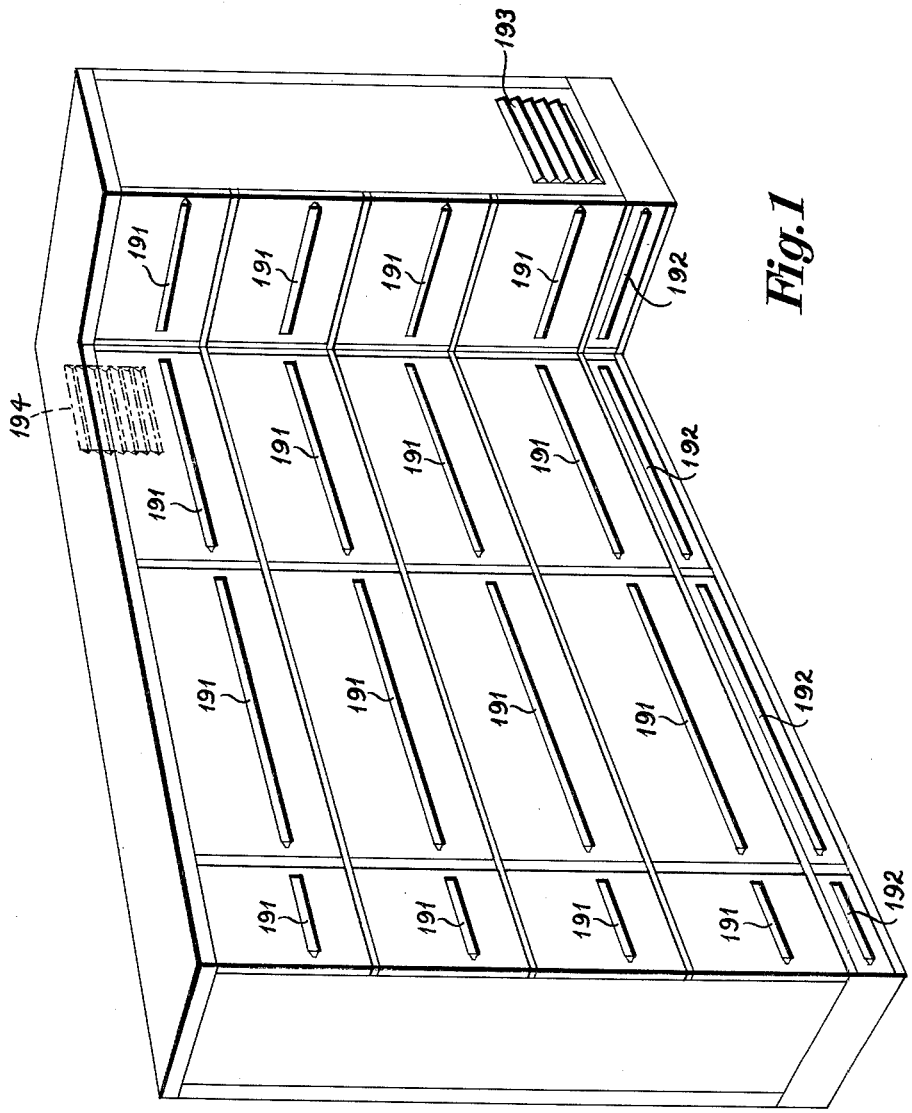
FIGURE 1 is an exterior view of the microfilm storage and television transmission unit.

The microfilm storage unit, an exterior view of which is shown in FIGURE 1, may be entirely constructed of metal. Those divisions of the facade identified by handles 191 are individual door panels hinged at the top to provide ready access to the interior of the unit. The handles 192 at the extreme bottom of the unit identify four drawers designed to contain a solution of sodium dichromate which is introduced as a means of stabilizing the relative humidity of the air within the unit, thus insuring proper and safe storage of bulk microfilm. Draft cooling of the local area housing the television cameras and illuminators is indicated by vents 193 and, at the top rear, 194. Forced cooling in this area may be had by the installation of a suitable commercial unit, if the particular location where the system is to be placed in service indicates such need.

Figure 3:
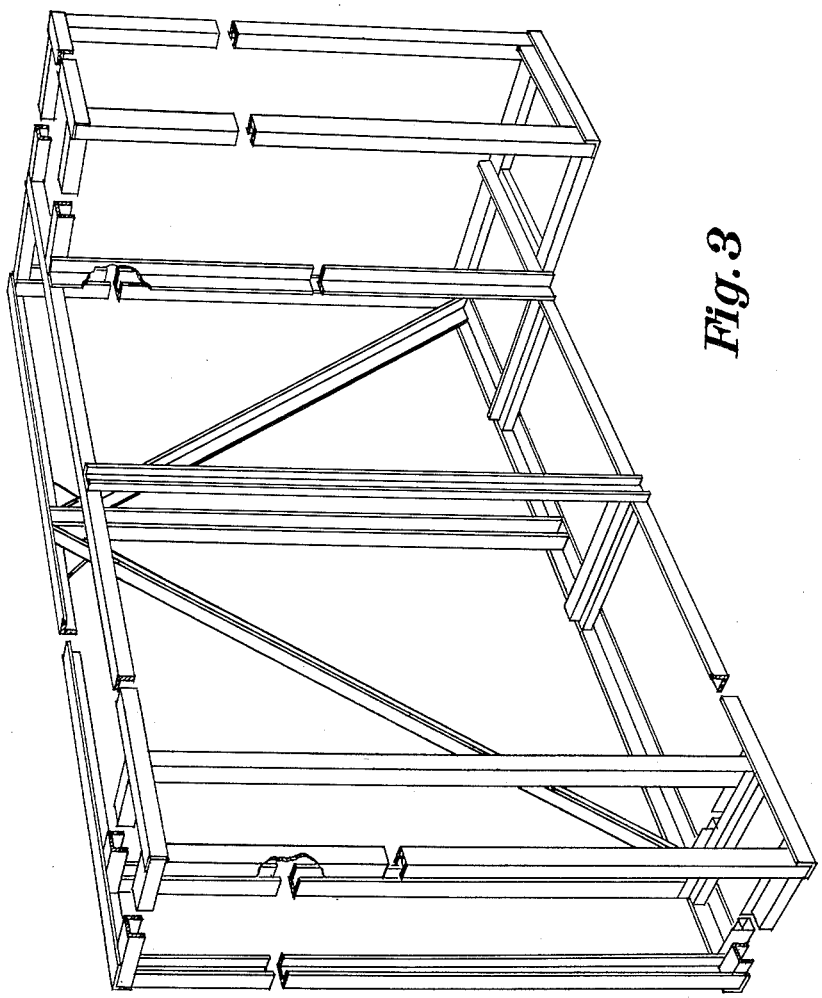
FIGURE 3 illustrates a typical frame for the selector-storage unit.

FIGURE 3 is a perspective view of the over-all unit's basic frame consisting entirely of appropriate angle stock. Although the specifications of this microfilm storage unit are quite flexible as to content capacity, it is recommended that for heavy-duty service in large installations, one unit be subdivided by four base plates 198 as shown in FIGURE 4, vents 202 being provided for air circulation.

Upon each of the four base plates 198 corresponding component elements are situated as shown schematically in FIGURE 2 which are identified as follows:

| | |
|---|---|
| 195 | Drum. |
| 196, 197 | Carrier guide units. |
| 67 | Carrier. |
| 199 | Microfilm cartridges and seats. |
| 200 | Drum arrestor housing. |
| 37 | Drum motor. |
| 64 | Closed-circuit television camera. |
| 119 | Station-point take-up reel. |
| 61 | Take-up reel motor. |
| 105 | Take-up leader. |

FIGURE 6 is an exploded perspective view showing the construction of a microfilm cartridge and its seat, identified as follows:

| | |
|---|---|
| 203 | Seat body, which is permanently secured to drum 195. |
| 204 | Upper roller detent, which is contained in upper detent housing 206 together with compression plate assembly 205. |
| 207 | Upper detent assembly retainer. |
| 208 | Lower roller detent, which is contained with its compression plate assembly 209 in housing 210. |
| 211 | Lower detent assembly retainer. |
| 212 | Microfilm cartridge body. |
| 213 | Microfilm reel, upon which is secured microfilm 270. |
| 214 | Inner spring retaining plate. |
| 215 | Spring, which is secured at its outer extremity to pin 216 and, at its inner extremity, to pin 217. The function of this spring is to aid in automatically retracting microfilm 270 when desired. |
| 218 | Outer spring retaining plate. |
| 219 | Roller bearing assembly of conventional design. |
| 220 | End plate with its integral lug 221. |
| 222 | Roller, which retains microfilm 270 in coupling 223 in the manner shown. |
| 224 | Backing spring for ball detent 120. |

FIGURES 5 and 7 are, respectively, a sectional end view and a cutaway elevation of the microfilm cartridge and seat assemblies which are numbered to correspond with the above-described exploded perspective and are thus self-explanatory.

Figure 9:
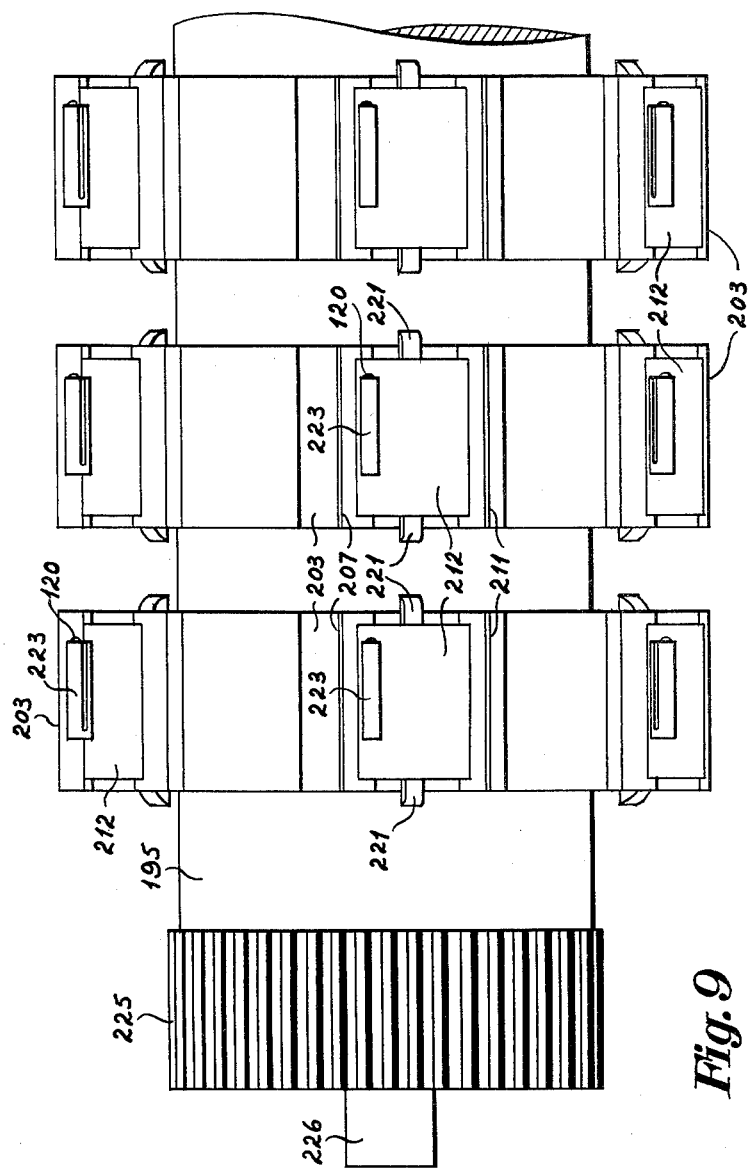
FIGURE 9 is a partial front view of the cartridge-seat assemblies.

FIGURE 9 is an elevation of drum 195 showing the manner in which the microfilm cartridges and their seats are applied to the surface of said drum. 225 is the drum's ring gear and 226 one of its two main bearings.

Figure 8:
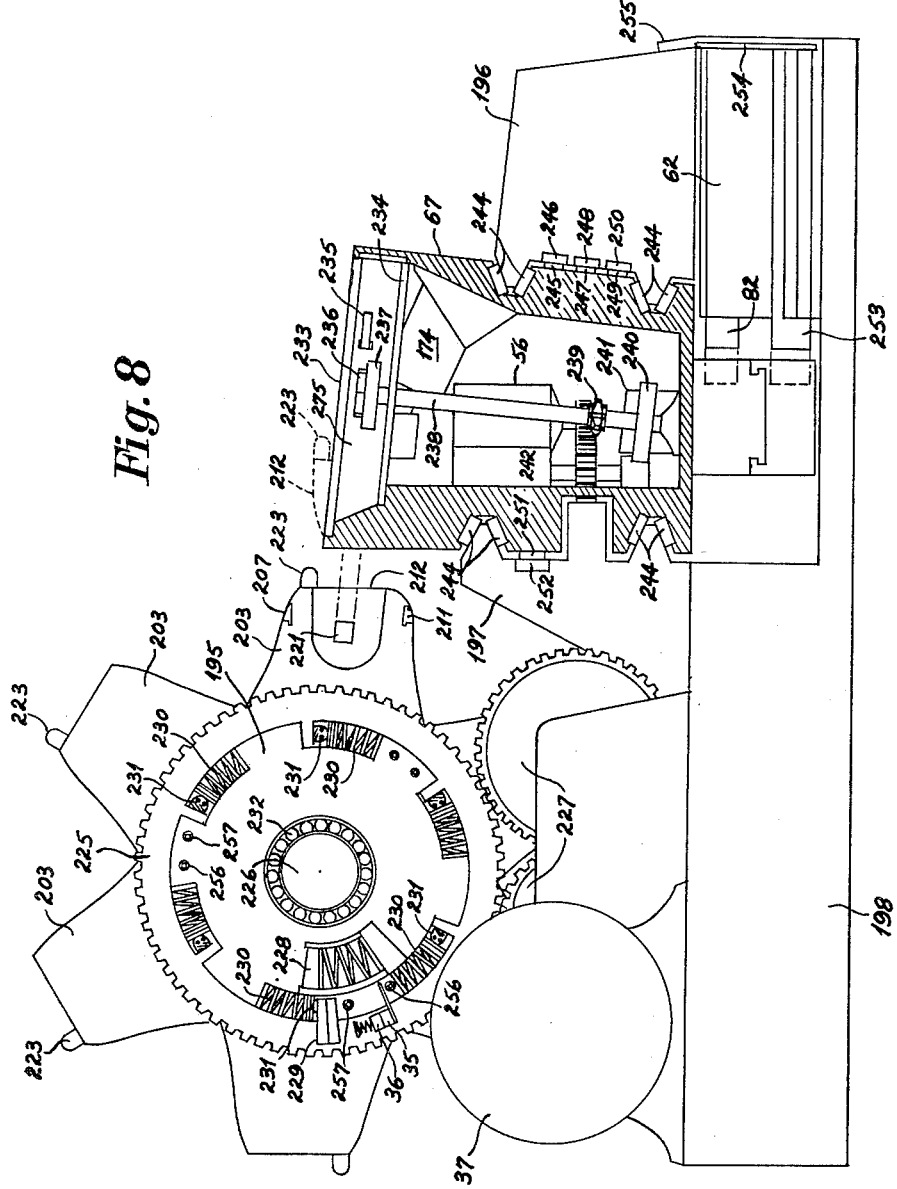
FIGURE 8 is a cutaway side view of the rotating drum, microfilm cartridge and seat assemblies, and the cooperating carrier unit in position for automatic extraction.
Figure 10:
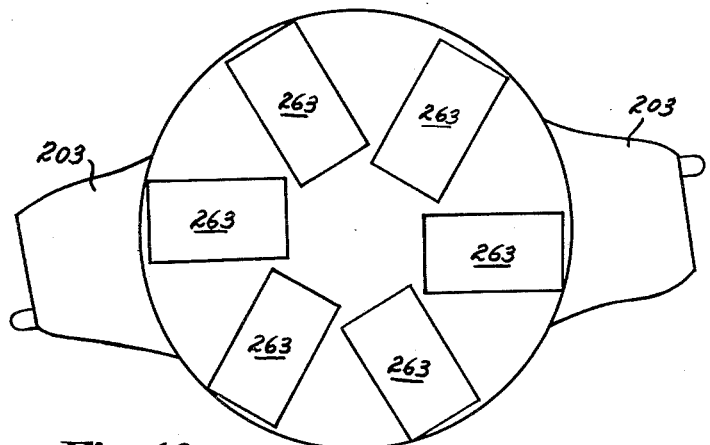
FIGURE 10 is a side view showing positions of the drum arrestors.
Figure 11:
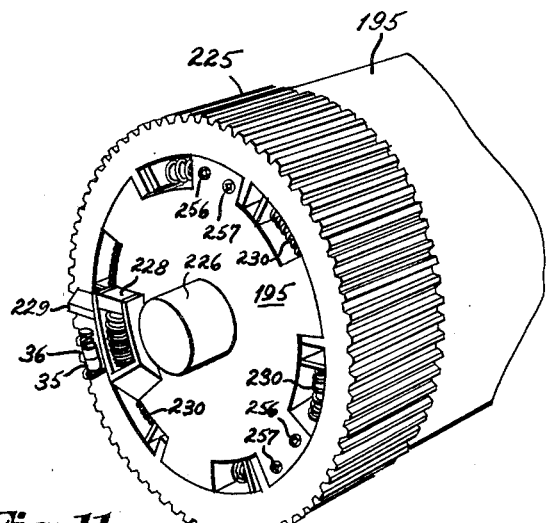
FIGURE 11 shows the driven end of the rotating drum, exposed to show the clutch assembly.

FIGURE 8 is an end view of drum 195, its microfilm cartridge and seat assemblies, its power arrangement, together with carrier 67 and its assemblies in their proper respective relationships. In the manner described in the electrical functioning narrative, motor 37 drives ring gear 225 clockwise at 5 r.p.m. through suitable reduction gears 227 until finger 265, shown in FIGURE 26, contacts primary arrestor 228. As shown in FIGURES 11, 12 and 14, ring gear 225 is independent of drum 195 so that when drum 195 is stopped by finger 265, with the shock being absorbed by spring-backed arrestor 228, ring gear 225 continues to turn until contact 36, attached to ring gear 225, separates from contact 35, attached to drum 195, and thereby stops motor 37. Ring gear 225 continues to turn until its flywheel effect is overcome by springs 230, causing secondary arrestor 229 to reverse its direction and abut against finger 267, said finger having been retracted by the passing element 229, and then allowed to resume its locking position after 229 has passed over it. As shown in FIGURE 27, finger 267 is free to retract when element 229 forces it to do so, but after said element has passed, spring 268 causes finger 267 to resume its former position, where it blocks element 229 when it reverses direction. Also shown in FIGURE 27 is solenoid 34 and its opposing spring 271. When energized, solenoid 34 causes unit 264 to move forward of outer body 263, shown in FIGURE 25, but against opposing spring 271. So long as solenoid 34 is energized, inner body 264 will remain in its forward position, but will retract into outer body 263 when 34 is de-energized and spring 271 is thereby allowed to become the dominant force. Lugs 261 are provided as retainers for solenoid 34 and cylinder 269. Thus, drum 195 becomes positively locked so that one of its six rows of microfilm cartridges and seats is in perfect alignment with respect to carrier 67. There being six rows of microfilm cartridges and seats spaced on the periphery of drum 195 as shown in FIGURE 8, there are also six arrestor assemblies spaced accordingly, as shown in FIGURE 10.

FIGURE 24 is a perspective view of the housing 200 which contains the above arrestor assemblies, some of which are shown in cutaway as they relate to housing 200 and drum 195. As indicated in FIGURE 14, ring gear 225 is keyed to drum 195 by three spring-loaded locks 258. To remove the ring gear, these locking elements may be allowed to depress into their seats by turning cams 257 clockwise. Access to the pivot points is also provided at 256. FIGURE 13 shows the relationship between ring gear 225 and springs 230, the tension of which may be adjusted by screw 231 which is shown enlarged in FIGURE 15.

In FIGURE 8 is shown a conventional ball bearing assembly 232 employed at both end bearing points of drum 195. The mechanical operation of carrier 67 and its associated elements is as follows: driven by motor 56 acting through idler 242 which bears on the integral rack of guide unit 197, carrier 67 moves laterally on guide units 197 and 196, roller bearings 244 indicating the four bearing points. If moving outbound from its station point, the carrier is stopped and locked by action of the track arrestor 62 as follows: when lower segment 262 of the carrier arrestor strikes lower segment 253 of the track arrestor, upper segment 259 continues to move under the carrier's inertia, and finger 82 is thereby forced to retract until opening 81 becomes aligned with it, at which time finger 82 moves into opening 81 by action of said finger's backing spring.

As shown in FIGURE 18, element 260 is an integral part of segment 259, this segment being permanently secured to the base of carrier 67, so that spring 261 will serve to overcome the carrier's inertia and cause opening 81 to be positively locked by finger 82. It is at this point that motor 174 is energized to propel cartridge unit 274 forward of the carrier at an angle of approximately 85 degrees, as shown in FIGURE 8, through suitable pinion and spur gears acting on the rack portion of unit 274. As this occurs, element 235 strikes the member 236 which causes cam 237 and, by means of chain drive 239, cam 274 to swing in a 90-degree arc, such angle being regulated by spring-backed governor unit 241 shown in FIGURE 21. These cams will then assume the positions shown in FIGURE 17, which positions permit unit 274 and its cooperating elements to appear as shown in FIGURE 22. The side elements 275 and 276, pivoted as at 282 and 281, respectively, and sprung at 283 and 284, respectively, cause the microfilm cartridge 212 to be withdrawn from its seat 203 when said side elements grasp cartridge segments 221. As will be later described in the electrical functioning explanation, motor 174 is then reversed, causing the cartridge to be moved out of its seat on drum 195 and moved into carrier body 67.

Figure 16:
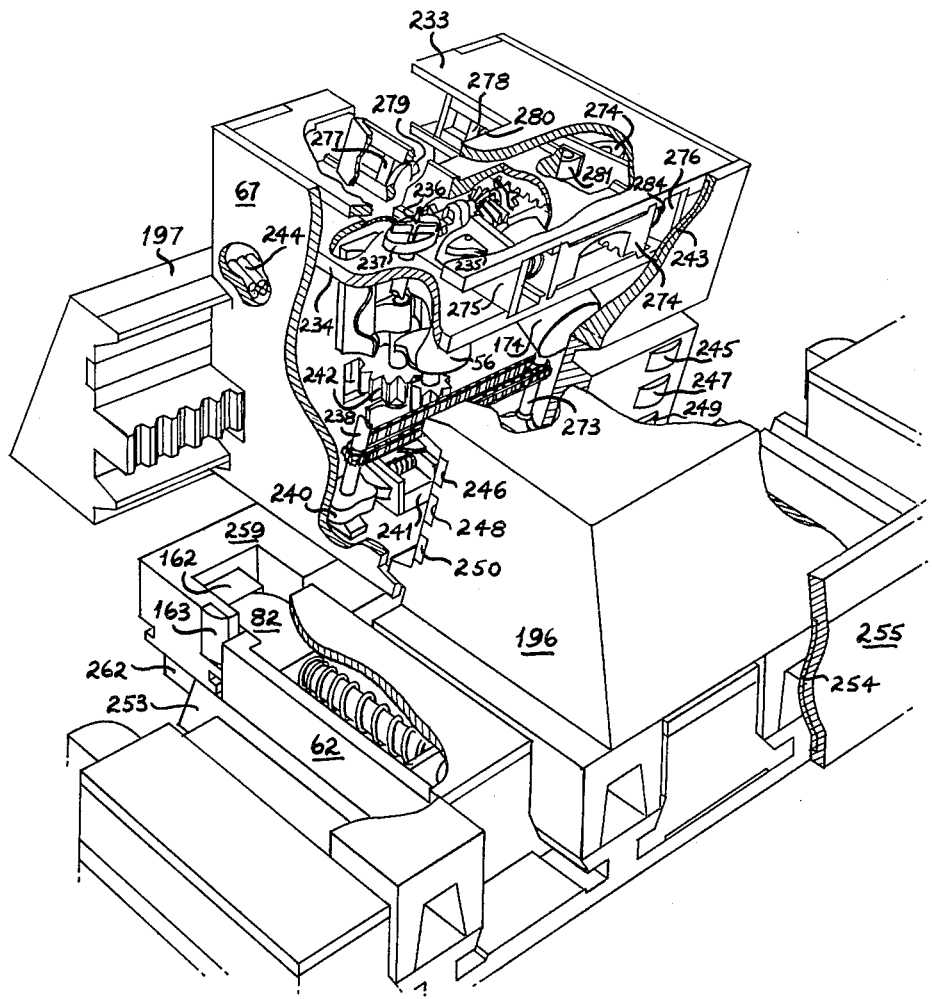
FIGURE 16 is a cutaway view of the carrier and track assembly.
Figure 37A:
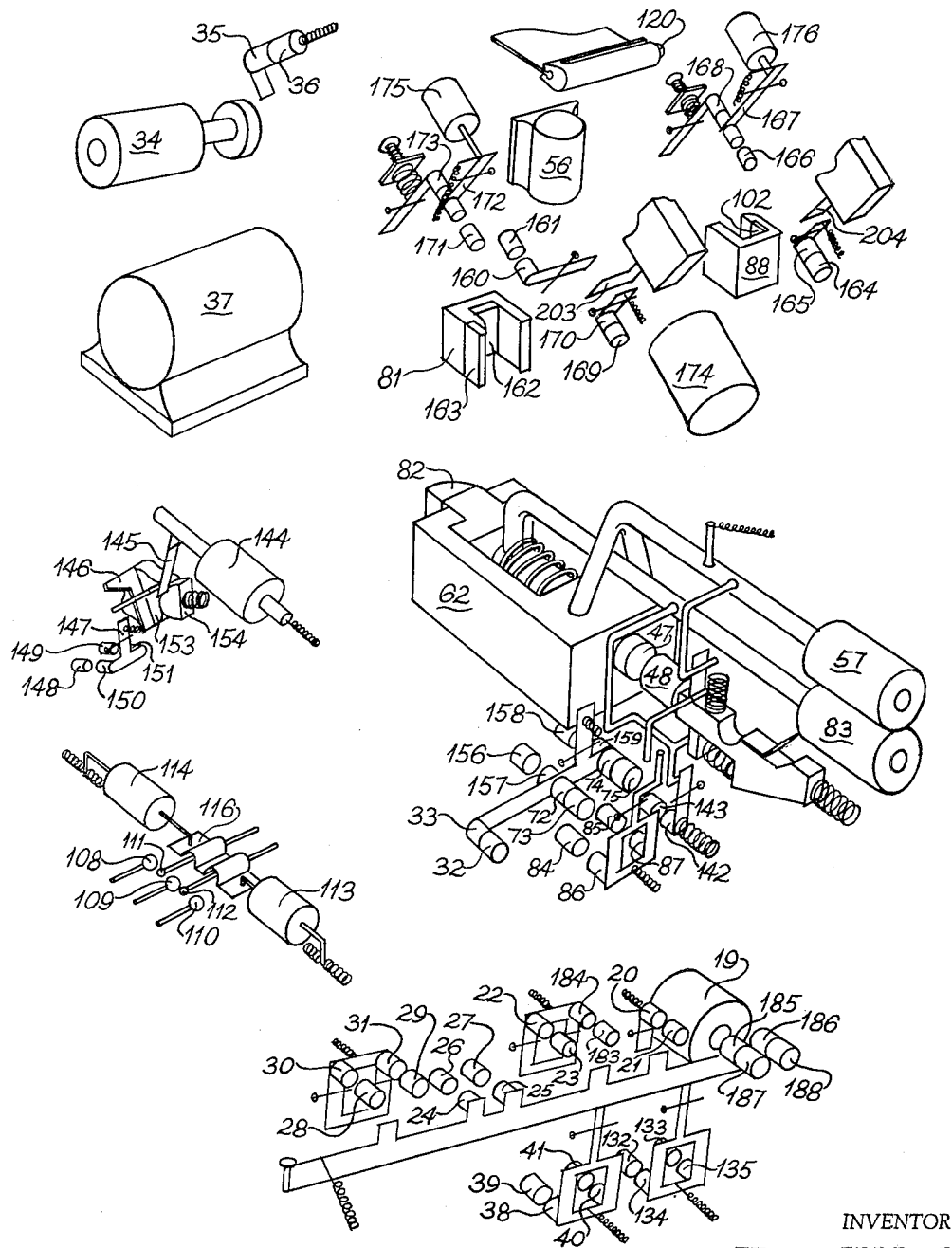
FIGURES 37A and 37B represent schematic placements of the elements of the invention, to be read in conjunction with FIGURE 38.
Figure 37B:
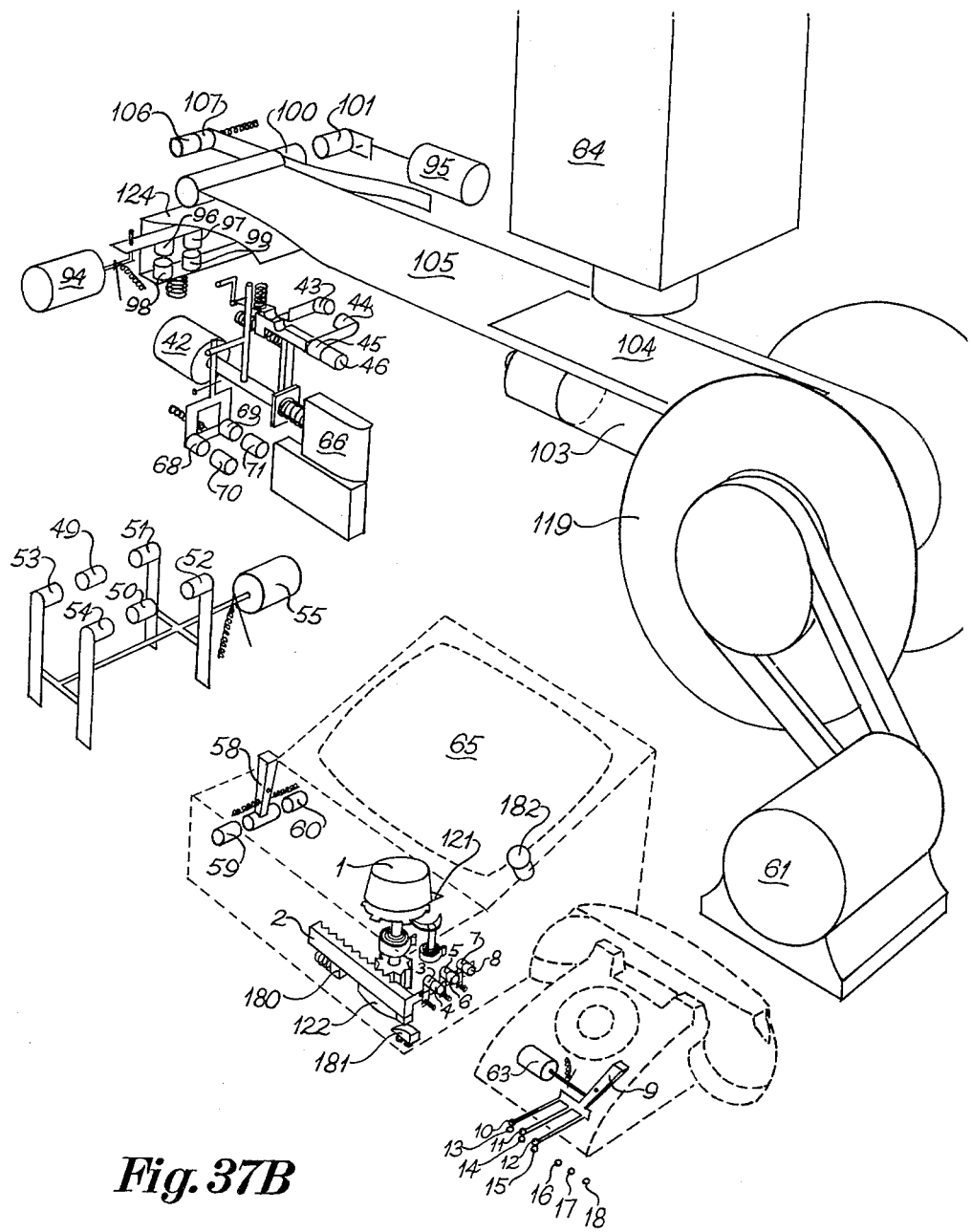
Figure 38:
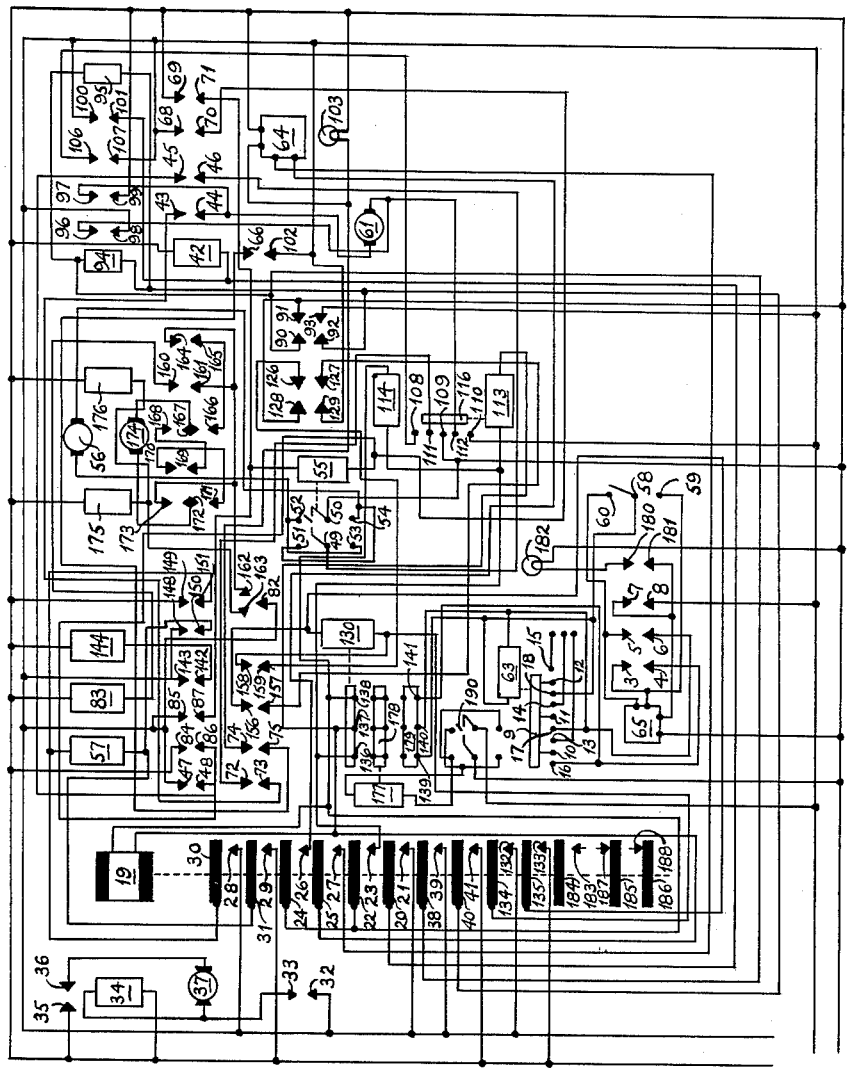
FIGURE 38 is a formal wiring diagram.

Since element 235 is spring-pivoted where shown in FIGURE 16, it does not affect cams 237 and 274 on its rearward movement. The members 277 and 278 are contact blocks which are backed by springs 279 and 280, which act to absorb the slight impact resulting when said contact blocks strike the cartridge elements 221. When cartridge unit 274 is fully retracted within the carrier body, it abuts against the element 243 which represents a shock-absorbing insert such as sheet cork. The designations 245, 247, 249 and 251 represent sprung electrical contacts designed to slide against conductors 246, 248, 250 and 252 and thus effectively transmit the various electrical circuits from the moving carrier to the non-moving guide units 196 and 197. 254 represents a shock-absorbing material as described above to be inserted in striker plate 255.

The track arrestors are ganged, as shown in FIGURE 16, beneath guide unit 196, one such arrestor being shown in its activated position. When cartridge unit 274 is next propelled forward from carrier body 67 (this time transporting the microfilm cartridge) element 235 will again strike a segment of member 236 to cause cams 237 and 274 to swing in another 90-degree arc and assume the positions as shown in FIGURE 21. As side elements 275 and 276 pass the above cams, they are forced to pivot at points 282 and 281 against springs 283 and 284 and thus assume the positions as shown in FIGURE 23. With the side elements forced outward in this manner, when the cartridge 212 is deposited in its drum seat 203, it will be retained by roller detents 204 and 208, shown in FIGURE 6, and cartridge unit 274 will thereby withdraw into carrier body 67 without forcing the above roller detents to release the cartridge, as described previously.

FIGURE 19 illustrates the contour of the carrier's perpendicular front, and FIGURE 20 illustrates the lower plate 234 which provides support for the pinion and spur gears, shown in FIGURE 16, as well as serving as a lower guide for the sliding cartridge unit 274, and providing bearing points for camshafts 238 and 273.

The station point of this system is shown in FIGURE 28. Television camera 64 is secured to a cast element 301, which, as shown in FIGURE 31, is secured to another cast (or fabricated, as desired) element 302. A take-up leader 105 is shown as it relates to all other elements, and its coupler 123 is shown as it would appear both before it is engaged by cartridge coupler 223 (when firmly held in place by spring-backed detent 286 in retainer body 285, as shown in FIGURE 30) and after it is so engaged. Since the portion of microfilm between the illuminator 103 and the camera 64 must be stabilized to prevent a distorted image projection, a suggested stabilizer for this purpose is shown in FIGURES 28 and 29. Consisting of two housings, 289 and 290 respectively, which rest on base 302, the frictionless, spring-backed stabilizing shoes are shown at 291, 292, 293 and 294, and their backing springs at 295, 296, 297 and 298. Shoes 291 and 293 are designed with provision for sufficient rise as required to accommodate the passage of the engaged coupling elements 123 and 223.

As described in the electrical functioning explanation, the take-up reel 119 (which has its bearing points in base 302, as shown) is driven by the motor 61 through a belt 300 acting on a pulley 299, the latter being secured to one side of take-up reel 119.

FIGURE 32 illustrates a perspective view of a supplementary microfilm cartridge retaining unit intended for use with a "standby" camera arrangement, as later described in the electrical functioning explanation. When it is necessary for a microfilm cartridge 212 to be manually removed from its seat 203 for use at a standby camera, said cartridge may be manually placed in retainer unit 313. To do so, segment 316 is first dropped back on its pivot 317, shown in FIGURE 33, to permit entry of the cartridge, after which said cartridge may be locked securely in the unit 313 by raising segment 316 until it is held in place by a spring-backed ball detent 318. Retainer 313 is then placed in frame 303, shown in FIGURE 34, and slid toward the opposite end of said frame. The locking pins 307 and 308 are forced to recede into the frame by pulling handle 306 to move segments 304 and 305 against the spring 309, shown in FIGURE 36, until the retainer 313 depresses springs 311 and 312, at which time the handle 306 may be released, causing the two pins 307 and 308 to enter corresponding mating holes 314 and 315 in the retainer 313. Thus, this retainer is securely locked in the frame 303 by the combined action of springs 311 and 312 and pins 307 and 308. When it is desired to release retainer 313 and cartridge 212, the above procedure is reversed. FIGURE 35 is an end view of frame 303, retainer 313, and cartridge 212, all elements being shown in their proper relationship.

With respect to the electrical functioning of the invention; the following description refers to the FIGURES 37A, 37B, 38 and 39 unless otherwise stated: When it is desired to view a microfile, the first operation that is performed is to turn the timer 1 clockwise to accomplish the following: Switches 3 and 4 are closed, as are 5 and 6. This action places the transmitting circuit of receiver 65 in parallel with the transmitting circuit of the cooperating telephone. Since 65 then becomes, in effect, an extension of the telephone, it will act as such by independently maintaining a completed circuit once made by the telephone.

Poles 7 and 8 are closed which closes the power circuit of 65.

The circuit of warning light 182 is opened when sliding contact 122 is forced by friction against member 181 to mechanically move away from the contact 180. This action is reversed as the timer 1 automatically moves counterclockwise until eventually unit 122 slides onto member 181 from the opposite direction, forcing unit 122 to abut against element 180 and thus eilluminate the warning light 182.

Having placed the receiver 65 in parallel with the telephone by the above operation, the operator then moves switch 9 to open 10 and 13, 11 and 14, 12 and 15, and close 10 and 16, 11 and 17, 12 and 18. This disconnects the telephone from its conventional "selecting-and-speaking" line and connects it instead to a "selecting-only" line. For illustration purposes it is assumed that the telephone is of the type having a 3-wire main cable consisting of two positive-polarity conductors and one negative-polarity conductor represented by 13, 15 and 14, respectively. In the "files-center" line represented by 16, 17 and 18, one of the normally positive-polarity conductors 18 is to be deenergized to render it neutral. Point 179 indicates a conventional dial switching system which is activated in the normal manner when the handset of the telephone is lifted. Upon hearing the dial tone, the operator then dials the number of the particular "microfile" he wishes to view. Unless the television camera serving the desired microfilm is in use at that moment, 179 connects the telephone, together with its "extension" receiver 65, to relay 19 through contacts 139 and 136, 140 and 137, and 141 and 138, thus energizing said relay to effect the following:

185 and 187, and 186 and 188 are instantly separated to prevent a feedback circuit from energizing solenoid 189.

28 and 30, and 29 and 31 are momentarily closed by a tripping action which momentarily energizes solenoid 57, thereby causing the track arrestor body 62 to be moved into its active position.

24 and 26, and 25 and 27, are positively closed which completes the transmitting circuit between camera 64 and receiver 65.

22 and 23 are momentarily closed, thereby momentarily charging 23 positive and completing the circuit of solenoid 63 through 141, 138, 22, 23, 136, 39, 63 and 140. This causes solenoid 63 to open contacts 10 and 16, 11 and 17, 12 and 18, and close contacts 10 and 13, 11 and 14, 12 and 15, thereby automatically restoring the telephone to its normal "selecting-and-speaking" line. This automatic restoration can be immediately noted by the visible portion of switch 9. Thus it is that, providing the camera serving the desired microfilm is not in use at the moment the microfile's number is dialed, the telephone is almost instantaneously restored automatically to normal service. If a connection cannot be made with the desired microfile's relay, one of two indications will immediately inform the operator of the cause: (a) if the desired microfile itself is in use, relay 19 will, of course, already be energized, and in the conventional manner dial switching system 179 will cause a "busy" signal to sound in the handset of the telephone; or, (b) if the camera serving the desired microfile is in use although the microfile itself is not, then no "busy" signal will result, but, since solenoid 189 will have forced switch 131 to misalign contacts 136 and 139, 137 and 140, and 138 and 141 (explanation to follow) the circuit of solenoid 63 will not close, and, therefore, switch 9 will not automatically move to its "normal service" position.

It is by this failure of switch 9 to automatically reverse its position that the operator immediately is aware that the microfile he desires is not in use, although the camera serving it is in use. In this event the operator may simply telephone a request to an attendant that the microfile he desires to view be manually removed from its seat on the drum and placed on a standby camera (hereinafter described). Continuing the operational sequence, the energizing of relay 19 also: forces 184 and 183 to momentarily close. As later detailed, in conjunction with the momentary closing of contacts 22 and 23, this action causes all other relays (corresponding to 19) served by the same camera to be rendered incapable of being energized until carrier 67 has completed its four-step cycle.

20 and 21 are momentarily closed (this to take place just before 57 is energized by 30 and 28, and 31 and 29). This causes solenoid 42 to be momentarily energized and so retract, electrically, the finger 66. By the same principle that applies to arrestor 62, 45 and 46 are forced to positively (as distinguished from "momentarily") close and 43 and 44 are forced to positively open. Just prior to the closing of 45 and 46, 68 and 70, and 69 and 71 are momentarily forced to close by a boss on the armature of solenoid 66, and, thus, solenoid 55 is momentarily energized to actuate a D.P.D.T. switch to complete the circuit of carrier drive motor 56 with a polarity direction necessary to cause carrier 67 to move outbound from its station point. The circuit is completed from 47 through 48, 45, 46, 49, 51, 54, 56, 53, 52 and 50. Just after the carrier 67 begins to proceed outbound from its station point, finger 89, by a tripping action, causes 90 and 91, and 92 and 93, to momentarily close, which action would normally cause the solenoids 94 and 95 to misalign their respective contacts. However, since these contacts are at this time already misaligned, the above tripping action at this point in carrier 67's cycle is of no consequence. When solenoid 57 is energized by action of relay 19 just after solenoid 42 is activated, the following occurs:

(1) Contacts 47 and 48 are positively closed. As motor 56 is connected in series with 47 and 48, and 45 and 46, the completing of its circuit is dependent upon both pairs of contacts being closed at the same time.

(2) Contacts 156 and 157, and 158 and 159 are opened to prevent first closing of 127 and 129, and 126 and 128, to energize solenoid 130.

(3) Contacts 33 and 32 are positively closed to energize solenoid 34 and motor 37, the latter through contacts 35 and 36. The motor 37 turns drum 195 until the desired row of microfile cartridges is selected by a mechanical arrestor actuated by solenoid 34, at which time the contacts 35 and 36 are mechanically opened and motor 37 is thereby stopped, as described herein with respect to the mechanical functioning of the invention.

(4) Contacts 74 and 75 are closed to permit the next closing of 102 and 66 to complete the power circuit of camera 64 and illuminator 103.

(5) Contacts 72 and 73 are closed, thereby permitting the next closing of 43 and 44 to complete the circuit of motor 61 to switch 116.

Motor 56 propels the carrier 67 outbound from its station point until finger-conductor 82 of track arrestor 62 contacts conductor 163 of element 81. At this point the mechanical and electrical functions and effects are closely interrelated, and they will therefore be described together.

The carrier arrestor element 81 mechanically forces finger 82 to retract, and by means of a suitable boss on the armature of solenoid 83 (which is directly connected to finger 82) acting in conjunction with a spring-backed detent, contacts 47 and 48 are separated, thereby stopping carrier drive motor 56 by opening its circuit. Simultaneously, when the finger-conductor 82 meets contact 163 of the element 81, the carrier solenoids 175 and 176 are energized until the carrier's inertia causes 163 to clear 82. The solenoids 175 and 176 force contacts 172 and 173, and 167 and 168, to close, respectively, thereby allowing the circuit of motor 174 to be completed when finger-conductor 82 clears 163 to snap into its mating opening of element 81 and contact 162. The circuit of motor 174 is then completed with a polarity direction necessary to propel the carrier cartridge unit 274 outward from the carrier body, said circuit being from lines 82 through lines 162, 173, 172, 174, 167 and 168. The motor 174 propels the carrier cartridge unit outward from the carrier body until it extracts the desired microfile cartridge from its seat on drum 195, at which time a lug 203 mechanically forces contacts 172 and 173 to open and contacts 172 and 171 to close as does lug 204 force, in the same manner, contacts 167 and 168 to open and 167 and 166 to close. This action reverses motor 174 by reversing its polarity, the circuit now being completed from 82 through 162, 164, 165, 166, 167, 174, 172, 171, 170 and 169. The carrier cartridge unit then retracts into the carrier body, so driven by motor 174, until the lug 203, by a tripping action, forces contacts 160 and 161 to momentarily close. This action momentarily energizes the solenoid 83 to accomplish the following:

(1) Contacts 82 and 162 are opened, causing motor 174 to stop.

(2) The boss on the armature of element 83 causes contacts 84 and 86, and 85 and 87 to momentarily close, thus causing the solenoid 55 to reverse its D.P.D.T. switch.

(3) The boss on the armature of 83 trips the spring-backed detent to cause 47 and 48 to close, thus completing the circuit of the motor 56 from 47 through 48, 45, 59, 53, 54 and 50.

Although the motor 174 is stopped by the momentary closing of contacts 161 and 160, contacts 170 and 169, and 165 and 164, will be positively opened when the carrier cartridge unit is fully retracted, which action insures that the circuit of motor 174 will be opened should contacts 161 and 160 fail to close. Thus, motor 174 is effectively protected from possible overload damage. Motor 56 having been activated, the carrier 67 proceeds back toward its station point, the second step of its four-step cycle. Just before reaching the station point, the finger 89 will, by its tripping action, cause contacts 126 and 128, and 127 and 129, to momentarily close. This, however, does not affect the circuit resistance element, solenoid 130, since the circuit these contacts control is dependent upon 159 and 158 for its completion—contacts which do not close until track arrestor body 62 is retracted.

When the carrier 67 reaches its station point, the finger 66 is mechanically forced by element 88 to retract, which action causes contacts 45 and 46 to open, thereby stopping the motor 56, and also causing contacts 43 and 44 to close, thereby allowing S.P.D.T. switch 58 to govern the energizing of the motor 61. When the inertia of the carrier 67 allows finger-conductor 66 to snap into element 88, the contacts 66 and 102 are closed. The latter operation energizes the power circuit of camera 64 and the illuminator 103, the latter of conventional design, and available commercially. When this occurs, an image of a standard fixed frame 104 in the take-up film leader 105 will be caused to appear on the screen of receiver 65.

This frame may consist of suitable wording such as "Microfile now ready for viewing." Upon noting this image on the screen of his receiver, the operator is free to manipulate S.P.D.T. toggle 58 to withdraw the microfile from its cartridge in the following manner:

To initially remove the microfile from its cartridge, the S.P.D.T. switch 58 is moved to contact 59. This causes the solenoid 113 to be energized and move the switch 116, thereby completing the circuit of motor 61 from line 110 through 112, 61, 44, 63, 72, 111, and 109. Should the operator at this time inadvertently move the switch 58 to contact 60, this action would normally cause the microfilm to retract into its cartridge, but if it is already within said cartridge when 58 and 60 are closed, the circuit of motor 61 will nonetheless remain open, as the ball detent 120, situated at the tip of the microfilm coupling element mechanically forces contacts 106 and 107 to open, so that motor 61 can be operated only in the direction necessary to extract the microfile until the contacts 106 and 107 are allowed to close by the microfile's being withdrawn from its cartridge.

Once the microfile has been initially withdrawn from its cartridge, it may be caused to reverse its direction by the movement of switch 58 to contact 60. This will neutralize the solenoid 113 and energize the solenoid 114, causing the motor 61 to reverse its former direction, the circuit now being from 107 through 106, 108, 111, 72, 73, 43, 44, 61, 112, and 109.

Switch 58, being of the spring-return, center-off type, to halt the movement of the film the operator need only release the toggle when the desired frame on the microfilm appears on the screen of television receiver 65, and, of course, said microfilm may be moved forward or backward at will simply by appropriately operating S.P.D.T. switch 58. If the operator desires to view a microfile longer than timer 1, of the conventional clockwork type, will automatically allow, the manual movement of the knob of said timer clockwise as needed will provide the additional viewing time required, The visible position of pointer 121 is an indication of the current viewing time remaining, but as an additional means of informing the viewer when only a very short time interval remains for viewing, a warning light 182 is provided, its operation being as follows: Rack 2 is forced to return to its original position by action of the timer 1 until the sliding contact 122 meets 181 and, by the resulting friction, is caused to abut against the contact 180. This completes the circuit of warning light 182 from 8 through 7, 181, 122, 180 and 182. The respective transmitting and power circuits as heretofore described remain intact until the timer 1 reaches its zero position either by manual or automatic action. When this occurs, rack 2 forces contacts 3 and 4, 5 and 6, and 7 and 8, to open, thereby affecting the various circuits as follows: The transmitting circuit is broken when contacts 3 and 4 are opened. In the conventional manner this causes the deactivation of the transmitting circuit at the dial switching system 179 and the corresponding de-energizing of relay 19. When the circuit of relay 19 is thus opened, the following occurs: Contacts 132 and 134, and 133 and 135 are momentarily closed by a tripping action of the armature of relay 19 to cause the solenoid 130 to force switches 131 and 173 to misalign their respective contacts. This action is provided in the event the telephone number of relay 19 should be dialed after it has been deenergized but before the cycle of carrier 67 has been completed.

Contacts 39 and 38, and 41 and 40, are momentarily closed by an armature tripping action of relay 19. This causes the solenoids 94 and 95 to be momentarily energized, which aligns the contacts 96 and 98, 97 and 99, and 100 and 101, respectively. If, at the moment timer 1 reaches its zero position, the microfilm is partially or wholly withdrawn from its cartridge, then the circuit of motor 61 will automatically be completed with a polarity direction necessary to cause the microfilm to be retracted into its cartridge, said circuit being from 98 through 96, 61, 97, and 99. If, however, the microfilm is already entirely within its cartridge when timer 1 reaches its zero position, or when said microfilm is caused by the above-described action to withdraw entirely within its cartridge, then the ball detent 120 will mechanically force contacts 100 and 101 to close, and thereby close the circuit of solenoid 42. Contacts 24 and 26, and 25 and 27, are positively opened which further opens the transmitting circuit of camera 64.

When contacts 185 and 187, and 186 and 188, are positively closed, solenoid 189 is permitted to function should another relay served by camera 64 be subsequently energized. When the finger-conductor 66 is electrically (as distinguished from "mechanically") retracted by the solenoid 42, a boss on said solenoid's armature releases a spring-backed detent, causing contacts 68 and 70, and 69 and 71 to momentarily close. This momentarily energizes the solenoid 55 to close its D.P.D.T. contacts 49 and 51, and 50 and 52. Contacts 45 and 56 are then allowed to close by the releasing of a spring-backed detent by the aforementioned armature boss, thereby completing the circuit of motor 56 from 47 through 48, 45, 46, 49, 51, 54, 56 53 52 and 50.

Propelled by the motor 56 the carrier 67 proceeds outbound from its station point (finger 89 causing contacts 92 and 93, and 90 and 91 to momentarily close and thus causing the solenoids 94 and 95 to misalign their respective contacts) until finger-conductor 82 of track arrestor 62 is encountered by the contact 163 of the female carrier arrestor element 81.

The action is then identical to that previously described as the carrier's microfilm cartridge unit is first extended from the carrier body and then retracted once more. Also, as previously described, the solenoid 83 is energized to electrically retract the finger-conductor 82, to cause solenoid 55 to reverse the polarity of motor 56 by closing contacts 49 and 53, and 50 and 54, and immediately following, to complete the circuit of motor 56 from 47 through 48, 45, 46, 49, 53, 56, 54 and 50. This propels carrier 67 once more toward its station point.

This being the last step of its four-step cycle the track arrestor unit 62 is caused to retract completely from its active position as follows: When the finger-conductor 82 is forced to retract, either electrically or mechanically, a boss on the armature of solenoid 83 momentarily closes the contacts 143 and 142 which causes the solenoid 144 to be momentarily energized. This action causes the lug 145 to move the governor 153 ninety degrees, such degree of movement being regulated by a spring-backed detent 154. On the fourth such movement, the eccentric 146 trips switch 147, causing contacts 148 and 150, and 149 and 151 to momentarily energize (after closing) solenoid 57 to retract the track arrestor body 62. When this occurs, the track arrestor forces contacts 33 and 32 to open, thus deenergizing solenoid 34 freeing drum 195, and forces contacts 156 and 157, and 158 and 159 to close. The latter action allows solenoid 130 to cause switch 131 to align its contacts with those of 173 when the carrier finger 89, by its tripping action, causes contacts 127 and 129, and 126 and 128 to momentarily close. Finally, contacts 74 and 75 are forced open by the retracted arrestor body to prevent the next closing of contacts 66 and 102 to energize the power circuit of camera 64 and illuminator 103, and contacts 72 and 73 are also opened by said arrestor unit as a means for preventing the motor 61 from being energized should the operator inadvertently operate switch 58 at the precise moment when dial switching system 179 has initially closed contacts 139 and 136, 140 and 137, and 141 and 138.

As the carrier 67 reaches its station-point to complete the fourth and last step of its cycle, the finger 66 is forced to retract by element 88, this action stopping the carrier drive motor 56 when the contacts 45 and 46 are opened.

As previously mentioned, should the camera serving a particular series of microfile cartridges be in use at the time more than one operator wishes to view a microfile of that series, provision is made for the manual removal of any given microfile and the manual placement of it at a "standby" camera by a files center attendant. Of course, as many of these standby cameras as seems desirable by the particular application of this files system may be installed and used as described herein. Each standby camera (and its corresponding illuminator) would be governed by a relay corresponding to 19, and the automatic operation of these standby cameras would be identical to that described heretofore, with the obvious exceptions. Upon manually removing the requested microfile cartridge from its seat on the drum 195, the attendant then places the cartridge at a standby camera and informs the operator of the telephone number controlling said camera's relay. The operation from this point, as regards the automatic extraction and retraction of the microfilm from its cartridge, is identical to that heretofore described.

Figure 39:
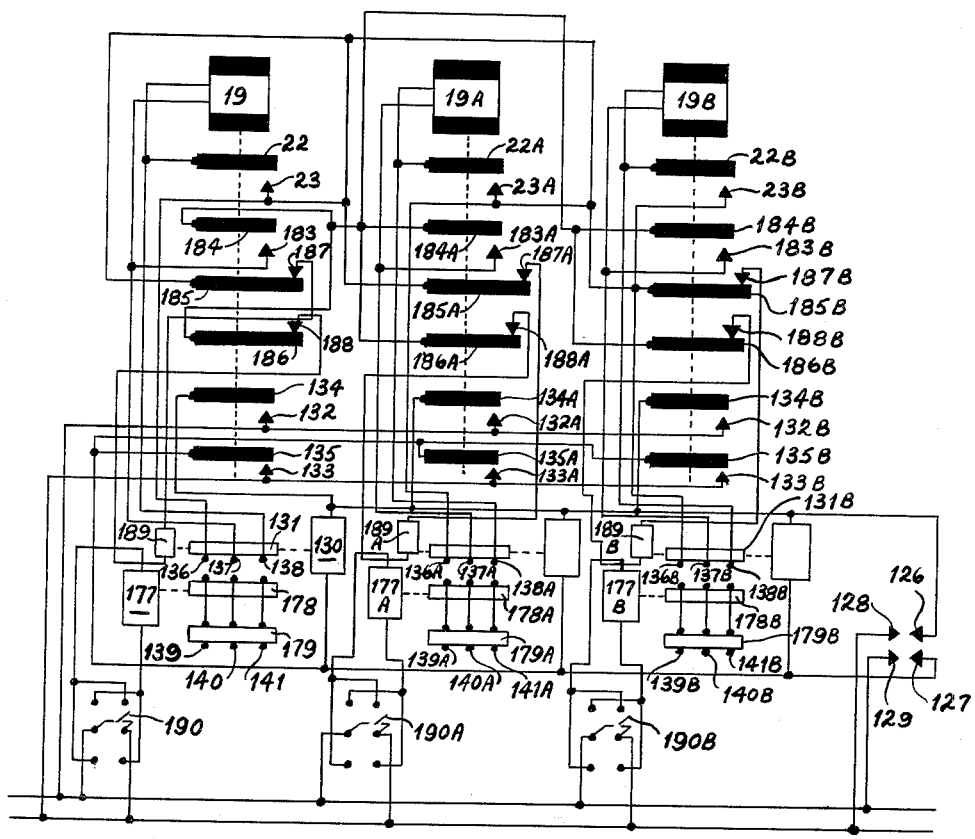
FIGURE 39 is a formal wiring diagram, showing a more-detailed section of FIGURE 38.
Figure 40:
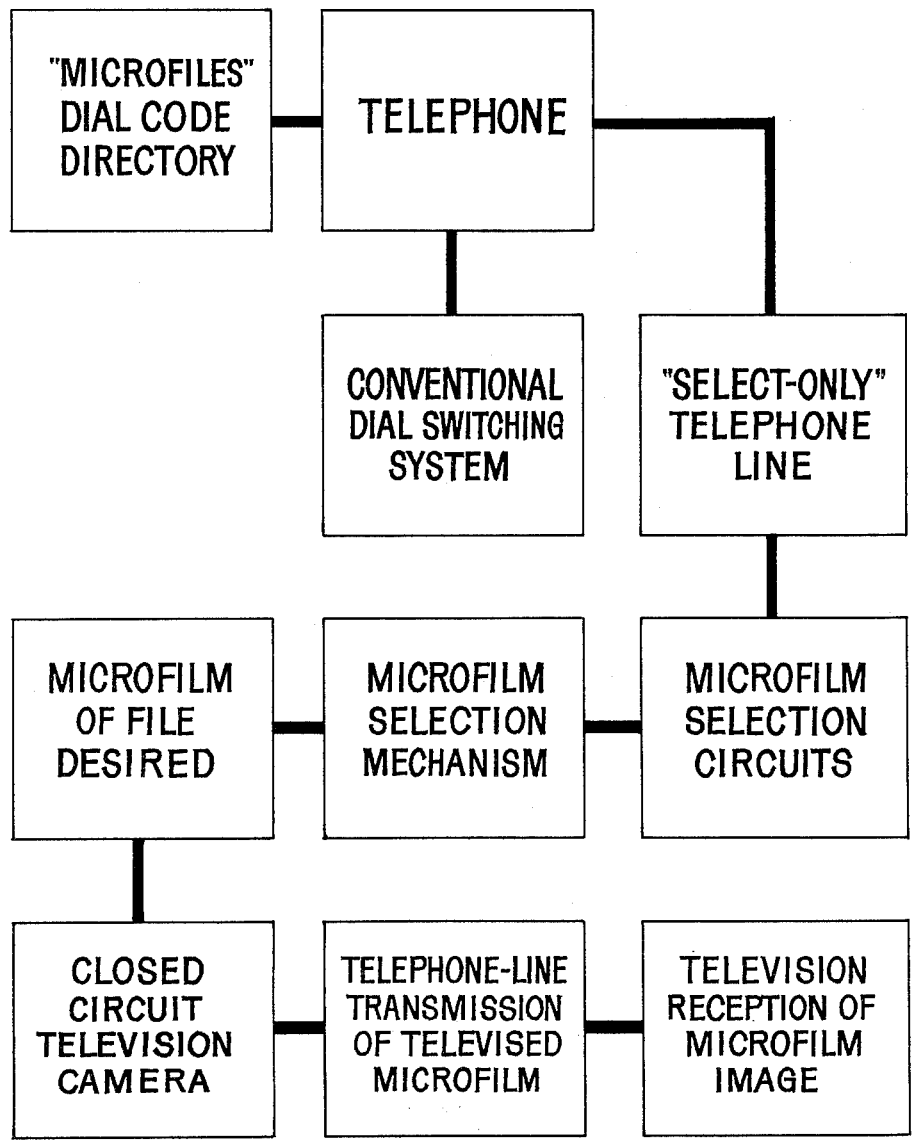
FIGURE 40 is a sequential block diagram of the basic elements of the over-all system.

At the end of such operation the attendant replaces the cartridge in its seat on drum 195 and then operates the series 190 switch to reverse switch 178 by the energizing of solenoid 177, thus allowing the relay 19 to be activated when its telephone number is dialed. Although it may be desired to employ dial switching system 179 as a means of rendering all other relays serving a common drum inoperable should their telephone numbers be dialed while the common camera is in use, an alternate method of accomplishing this is shown in FIGURE 39.

Here only three relays, series 19, are shown, since the interconnection of any other desired number of relays would be the same. When relay 19 is energized, contacts 22 and 23, and 184 and 183 are momentarily closed, while contacts 187 and 185, and 188 and 186 are positively opened. By such action, the solenoids 189A and 189B are momentarily energized to actuate switches 131A and 131B, respectively, and thus render relays 19A and 19B inoperable, the circuit to 189A being from 138 through 22, 23, 185A, 189A, 188A, 186A, 184 and 183, while the circuit to 189B is from 138 through 22, 23, 185B, 187B, 189B, 188B, 186B, 184 and 183.

When the relay 19A is energized to momentarily close contacts 22A and 23A, and 184A and 183A, and positively open contacts 187A and 185A, and 188A and 186A, to actuate solenoid 189 the circuit is from 138A through 22A, 23A, 185, 187, 189, 188, 186, 184A and 183A. To actuate the solenoid 189B the circuit is from 138A through 22A, 23A, 185B, 187B, 189B, 188B, 186A, 184A and 183A.

When the relay 19B is energized to momentarily close the contacts 22B and 23B and positively open the contacts 187B and 185B, and 188B and 186B, to actuate solenoid 189 the circuit is from 138B through 22B, 23B, 185, 187, 189, 188, 186, 184B and 183B. To actuate solenoid 19A the circuit is from 138B through 22B, 23B, 185A, 187A, 189A, 188A, 186A, 184B and 183B.

When the relay 19 is deenergized by the dial switching system 179, contacts 134 and 132, and 135 and 133 are momentarily closed which in turn momentarily energizes the series 130 solenoid to actuate the series 131 switch. This action affects only the switch related to the deenergized relay, since all other series 131 switches 131 were previously moved to their "misalignment" position by the series 189 solenoid, as outlined in the foregoing. However, all series 131 switches related to relays serving the common drum 195 are restored to their original "alignment" position when the carrier finger 89, by its tripping action, causes the contacts 126 and 128, and 127 and 129 to momentarily close and thus energize the series 130 solenoid 130 with a polarity direction necessary to effect the above restoration.

It is to be understood that the form of our invention, herewith shown and described, is to be taken as a preferred example of the same, and that various changes in the shape and arrangement of parts may be resorted to, without departing from the spirit of our invention, or the scope of the subjoined claims.

We claim:

1. In an automatic files system, a rotatable drum, a plurality of microfilm cartridges on said drum peripherally mounted with respect thereto, said cartridges being adapted for removal and replacement in position on said drum, a cartridge selector having means to remove and transport a selected cartridge to a point for camera viewing, means to unroll said cartridge for said camera viewing, said selector having means to automatically pick up and replace a selected cartridge, a television camera at said point, a telephone circuit in interconnection with said selector and said camera, means in said circuit responsive to said interconnection to actuate said selector and said camera, means to time the duration of exposure to said camera, a closed circuit television camera arranged to view said cartridge when unrolled, and circuit means in association with said telephone subject to manual intervention to automatically actuate said cartridge selector, said unrolling means, said camera, said receiver and said time duration means.

2. In an automatic files system adapted for remote control and viewing of microfilm files at a point removed from the storage place thereof, a circular, rotatable carrier having a series of microfilm cartridges mounted about the periphery thereof, a selector unit for removing said cartridges from and replacing said cartridges on said carrier, means in association with said selector for moving said selector and one of said cartridges to a camera viewing point, a television camera at said point, a cartridges unrolling means to place the unrolled microfilm for viewing by said camera, a remotely located television receiver in closed circuit interconnection with said camera, and circuit means automatically controlling said carrier, said selector, said selector moving means, said camera and said receiver, a telephone circuit, in operative association with said circuit means, said circuit means being responsive to manual actuation of said telephone circuit.

3. In an automatic files system adapted for remote control and viewing of microfilm files at a point removed from the storage place thereof, a circular, rotatable carrier having a series of microfilm cartridges mounted about the periphery thereof, a selector unit for removing said cartridges from and replacing said cartridges on said carrier, said selector unit having means to automatically position said unit before the selected cartridge, means in association with said selector for moving said selector and one of said cartridges to a camera viewing point, a television camera at said point, a cartridge unrolling means to place the unrolled microfilm for viewing by said camera, a remotely located television receiver in closed circuit interconnection with said camera, and circuit means automatically controlling said carrier, said selector, said selector moving means, said selector positioning means, said camera and said receiver, a telephone circuit, in operative association with said circuit means, said telephone circuit being provided with a "select only" circuit, said circuit means being responsive to manual actuation of said telephone by said "select only" circuit.

4. In an automatic files system adapted for remote control and viewing of microfilm files at a point removed from the storage place thereof, the combination comprising: a rotatable drum having a series of microfilm supports thereon, each of said supports having means to removably position microfilm thereon radially with respect to said drum, a carrier support positioned adjacent said drum and in axial alignment therewith, a movable carrier adapted to traverse said carrier support, a station point having a transverse camera adjacent thereto to view said microfilm, means to rotate said drum and said microfilm supports to a predetermined position, means to selectively station said carrier at said station point and said predetermined position, means on said carrier to remove a preselected microfilm at said predetermined position, means to unroll said microfilm for viewing at said station point, a remotely located television receiver in closed circuit interconnection with said camera, circuit means automatically controlling said drum, said carrier, said microfilm unrolling means, said television camera and receiver, a telephone circuit in operative association with said circuit means, said telephone circuit being provided with a "select only" circuit, said circuit means being responsive to manual actuation of said telephone by said "select only" circuit, whereby, upon actuation of said last named circuit a predetermined microfilm is selected by said carrier and transported thereby to said station point, said film is unrolled and viewed by said camera and transmitted for viewing by said television receiver.

References Cited in the file of this patent

UNITED STATES PATENTS

| | | |
|---|---|---|
| 1,906,646 | Smith | May 2, 1933 |
| 2,206,134 | Streyckmans | July 2, 1940 |
| 2,408,293 | Carmel | Sept. 24, 1946 |
| 2,565,881 | Peters | Aug. 28, 1951 |
| 2,568,734 | Heyer | Sept. 25, 1951 |
| 2,914,746 | James | Nov. 24, 1959 |